United States Patent [19]

Tangorra

[11] 3,840,060
[45] Oct. 8, 1974

[54] PNEUMATIC TIRE
[75] Inventor: Giorgio Tangorra, Milan, Italy
[73] Assignee: Industrie Pirelli S.p.A., Milan, Italy
[22] Filed: July 19, 1972
[21] Appl. No.: 273,210

[30] Foreign Application Priority Data
July 30, 1971  Italy.................................. 83673/71

[52] U.S. Cl......... 152/353 R, 152/353 C, 152/355, 152/357, 152/361 R
[51] Int. Cl........ B60c 9/02, B60c 9/18, B60c 13/00
[58] Field of Search............................ 152/352–355, 152/357, 361, 374

[56] References Cited
UNITED STATES PATENTS

| 3,253,636 | 5/1966 | Travers............................. | 152/354 |
| 3,394,751 | 7/1968 | Sidles et al....................... | 152/352 |
| 3,464,477 | 9/1969 | Verdier.............................. | 152/353 |
| 3,480,065 | 11/1969 | Verdier.............................. | 152/353 |
| 3,682,221 | 8/1972 | Marzocchi et al................. | 152/357 |

FOREIGN PATENTS OR APPLICATIONS

| 1,073,332 | 1/1960 | Germany........................... | 152/353 |

*Primary Examiner*—Drayton E. Hoffman
*Attorney, Agent, or Firm*—Clelle W. Upchurch

[57] ABSTRACT

This invention relates to a pneumatic tire of the type having substantially inextensible lateral edges of a reinforced tread band portion, and, therefore, radially inextensible sidewalls. According to the invention, the sidewalls are convexly curved towards each other, i.e., turned towards the tire midplane so that internal pneumatic pressure acting laterally outwardly against said sidewalls simply tends to reduce their degree of convexity thereby placing them under compression. The sidewalls comprise three zones, two at the sidewall extremities and the third midway between the other two, which zones are of reduced bending stiffness relative to the remainder of the sidewall portions.

11 Claims, 5 Drawing Figures

PNEUMATIC TIRE

The present invention relates to pneumatic tires for vehicle wheels, and more precisely it concerns a new tire structure which permits one to obtain important advantages as regards manufacture, behaviour under load and ability of absorbing obstacles.

It is known, inter alia, that the conventional tires comprise a carcass constituted by a plurality of plies, whose cords are subjected to tension in consequence of the inflation pressure; to said plies, during the tire build-up, other components are added, such as the bead cores about which said carcass plies are turned up, the tread band, the breaker positioned between the tread band and the carcass, and other reinforcements and fillers having particular functions. The obtained assembly is then shaped and at last cured in a mold. It is evident that the manufacture of such a complicated structure cannot be mechanized beyond certain limits, so that, even today, manual operations in tire industry prevail over mechanical operations.

Processes are known for realizing tires devoid of carcass plies or breaker plies, and simply formed by pouring or injecting particular substances, such as synthetic resins or special rubbers, into appropriate molds.

None of such processes, however, has given positive results because of the inability of such substances to confer the necessary mechanical characteristics to the tire.

Other attempts to simplify, at least partially, the tire construction, consist of eliminating the carcass plies and in maintaining only the breaker plies so that the sidewalls of such tires are composed only of rubber.

However these attempts have not given satisfactory results.

The present invention seeks to provide a pneumatic tire which can be built up at least in part, by means of the conventional processes of pouring, injection, or molding on a male, with all the consequent economical advantages permitting in any event the use of materials already tried in the tire industry and offering at the same time unexpected characteristics in respect of behaviour (such as a very good comfort) and of elastic absorption of obstacles.

Accordingly, the objects of the present invention are realized by a pneumatic tire for vehicle wheels which comprises a tread reinforced by an annular structure substantially inextensible in the transversal and the circumferential direction, two sidewalls extending between the lateral edges of said tread, said edges being radially inextensible, and beads adapted to firmly fit in the flanges of a rigid rim of the wheel, and in which said sidewalls are strongly convex towards the tire midplane and have a linear development of their section midlines which is greater than the maximum distance existing between the lateral edges of the tread and the flanges of the rim at the maximum eccentricity admissible between said tread and said rim. Said sidewalls have a compressive and bending stiffness whereby said convexity does not change sense while under working pressure and at said maximum eccentricity. Each of said sidewalls comprises three portions, namely two portions adjacent to said lateral edge of the tread and respectively to said bead, and a third portion, substantially equidistant between the first two, in which the bending stiffness in the meridian planes has a value lower than that of the analogous stiffness of the remaining parts of the sidewall.

In the present specification, the expression "bending stiffness" means for bending moment necessary to impart a unitary curvature variation at a certain point of the neutral axis of the specimen. In this description, for sake of simplicity, reference is made to a specimen reproducing the meridian section of the tire and having a unitary thickness measured in the direction of the parallels of the tire itself.

Preferably, the ratio between the bending stiffness at least at one of the low stiffness zones of each sidewall and the bending stiffness of the other zones of said sidewall does not exceed the value of 0.6 and is advantageously comprised between 0.6 and 0.01.

Preferably, the different values of bending stiffness are obtained by imparting different thicknesses to the meridian section of each sidewall; however, it is possible to provide also the use of various materials having different moduli of elasticity, for instance of a compound having a relatively low modulus at the zone of smaller stiffness and of a compound containing reinforcing fillers or other reinforcing materials, oriented, if desired, along a preferred direction, at the zone of greater stiffness.

In the present specification, the expression "modulus of elasticity" of a compound means the modulus of linear elasticity or Young modulus E, measured at one-tenth of the tensile strength of the compound, according to the known formula:

$$F/s = E \, \Delta l/l$$

where:
$F$ is the load applied to the specimen
$s$ is the specimen section
$l$ is the initial length of the specimen
$\Delta l$ is the deformation originated by load F.

According to a preferred embodiment of the invention, the inextensible annular reinforcement at least in proximity of its connection with each sidewall, has a curvature whose concavity is directed towards the tire inside (midplane).

The invention will now be better illustrated with reference to FIG. 1, which represents in section a deflated tire, carried out according to said preferred embodiment of the invention.

The enclosed figure represents the cross section of a deflated tire comprising a tread band 17, an annular reinforcing structure 18, two sidewalls 19 and 20 and two beads 21 and 22.

The tire is mounted on a rim 23, having flanges 24 and 25, and provided with a normal valve 26 for the admission of the inflation air.

The annular reinforcing structure 18 can be of various conventional types; for instance, it can be of the type described in the Italian Pat. No. 869,165. Although said structure is radially flexible, especially at the central zone of the tread, it is however, inextensible both in the direction of the meridians and in the direction of the parallels of the tire when it is stressed by the inflation pressure.

Said reinforcing structure is not necessarily constituted by layers or cord fabrics, but also, for instance, by homogeneous material in the form of foils, having a resistance to tension sufficient to withstand the action of the inflation pressure and of stresses originating during service.

The inextensible structure 18 extends axially for the whole upper portion of the tire, concerning also the extreme lateral zones of the latter which are respectively connected to the sidewalls 19 and 20.

Since the annular structure 18 — as said above — is inextensible, the average distance between the two lateral ends of said annular structure and the flanges 24 and 25 of the rim 23 can be considered as substantially invariable, since each point of said ends and of said flanges belongs to an inextensible circle and, respectively, to an incompressible circle.

In the tire illustrated by way of example in the FIG. 1, in which the maximum section width is of about 150 mm, the distance between the lateral ends of the inextensible structure and the flanges is of the order of 30 mm; in the same tire the section height is of the order of 70 mm.

In the preferred embodiment illustrated in FIG. 1, the annular reinforcement 18, at the zones of connection with the sidewalls 19 and 20, has a curvature whose concavity is directed towards the tire inside; the tangent to the profile of said structure in such zones of connection forms with the horizontal axis XX, parallel to the axis of rotation of the tire, an angle $\alpha$ of 40°.

These sidewalls, having section midlines 27 and 28, possess a curvature whose convexity is directed towards the tire inside, and their total linear development is well greater than the maximum distance existing between the lateral ends of the inextensible structure 18 and the flanges 24, 25 at the maximum eccentricity admissible between the reinforced tread and the rim, so that said convexity directed towards the tire inside is always maintained, and the three zones of lower bending stiffness in the meridian plane act substantially as hinges.

Considering the tire structure is further detail, and making reference to the sidewall 19, symmetrical to the sidewall 20, six typical zones can be seen: the zone 29, connecting said sidewall to the upper portion of the tire, and the zones 30, 32 and 34, having a bending stiffness, in the meridian plane, of a value lower than that of the adjacent zones 31 and 33. As said above, zones 29 and 21 belong the inextensible and respectively incompressible circles; therefore, they define points whose average distance, on the whole contour of the tire, is substantially invariable.

For this reason, when the inflation air is admitted in the tire, the sidewalls 19 and 20 will displace towards the outside by a certain amount which, in any event, will be such as to maintain the convexity of the section midline directed towards the inside, while the sidewalls themselves will be subjected to compression, reacting on said zones 21 and 29.

For instance, the sidewalls can be constituted of a rubber compound having a modulus of elasticity of about 40 Kg/cm$^2$. On account of the thicknesses adopted for the zones 30, 31, 32, 33 and 34, the ratio between the bending stiffnesses of the zones 30 and 31 is equal tO 0.39; said ratio, between the zones 34 and 33, is equal to 0.51, while the ratio between the bending stiffness of the zone 32 and that of the zone 31 (or of the zone 33) is equal to 0.21.

Figure 1:
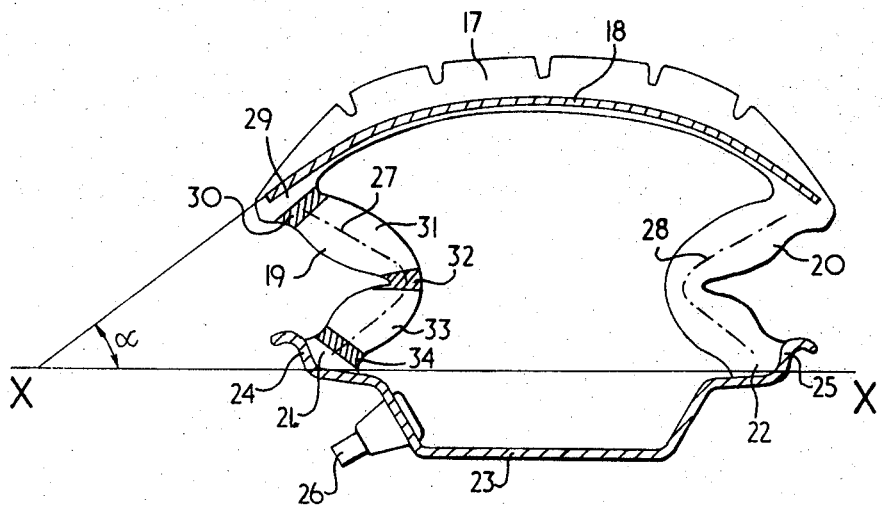
Figure 2:
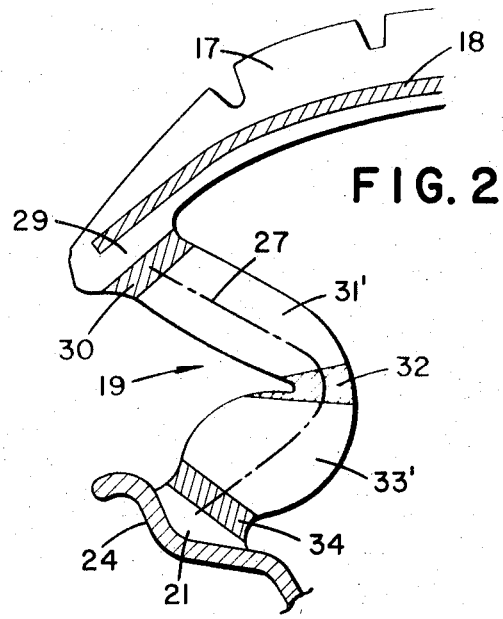
FIG. 2 and FIG. 3 are enlarged partial views similar to FIG. 1 having modified structures in the side walls.

FIG. 2 shows a tire sidewall wherein adjacent zones 31' and 33' are made of materials having a different modulus of elasticity than zones 30, 32 and 34.

Figure 3:
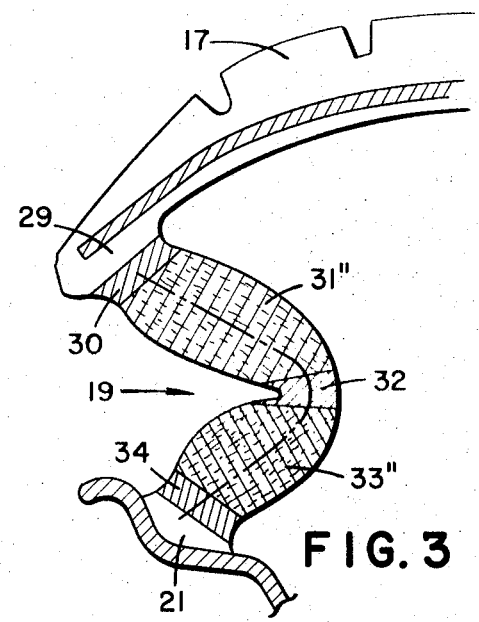

The zones 31'' and 33'' in FIG. 3 contain short glass fibers oriented along a direction of preference for reasons explained infra.

Figure 4:
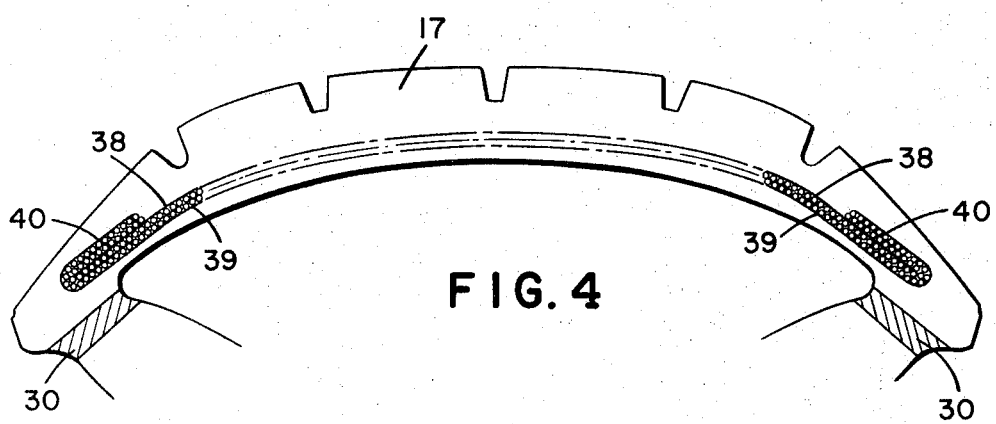
FIG. 4 is an enlarged partial view of the tread area illustrating a modified annular reinforcement.

FIG. 4 shows a reinforcing element of two layers of cords 38 and 39 whose cords are crossed to each other wherein layer 39 has turned-up edges 40 to give added strength at the end of the reinforcing element.

Figure 5:
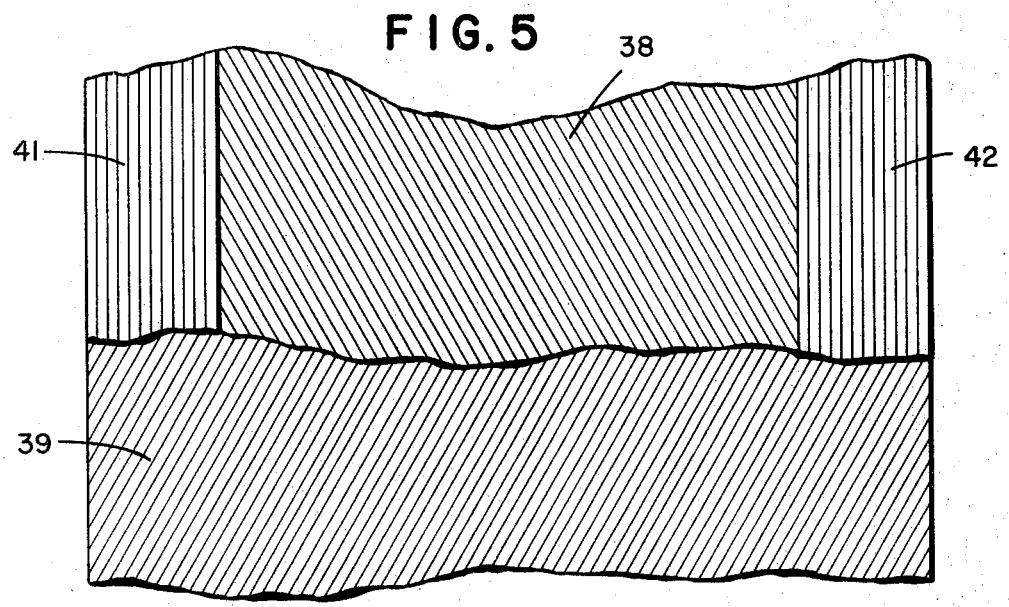
FIG. 5 is a plan view of the annular reinforcement of FIG. 4 incorporating additional reinforcing elements at the end of the annular reinforcement.

In place of the turned-up edges 40, there can be used reinforcing strips 41 and 42 as shown in FIG. 5 to give additional strength to the terminal portions of the reinforcing element.

Moreover, the compounds can contain short glass fibers oriented along a preferred direction, so as to modify within wide limits and in the desired zones the features of bending stiffness and/or resistance to compression.

The advantages offered by the tire according to this invention are many. FOr example, the sidewalls do not contain continuous reinforcing structures and therefore can be obtained by means of a simple pouring or injection molding process, or the like.

This results in economical advantages, due to the possibility of a larger mechanization with respect to the present technique of construction of normal tires and to the greater uniformity of production.

Further, owing to the particular configuration of the tire according to the present invention, and in particular to that of its sidewalls, in the event of a puncture, with the consequent drop of pressure, the tire does not collapse completely, and its sidewalls are able to bear, even if at reduced speed and for a relatively short run, the load of the vehicle, without the risk of a complete destruction of the tire and with a better safety for the user.

Moreover, it has been surprisingly ascertained that the radial stiffness of the described tire is independent of its transversal stiffness.

It is well known that, when the inflation pressure in normal tires is increased, both the radial stiffness and the transversal stiffness are also increased; in other words, these two stiffnesses are correlated to each other and are both depending on the value of the inflation pressure, so that, if it is wished to increase the transversal stiffness to obtain a better transversal resistance of the tire, it is necessary to accept a reduced comfort.

It is understood that the above described example has not a limiting character, and that the field of protection of the present invention includes any other alternative embodiment deriving from the above indicated inventive concept. In particular, the above described invention can be applied to any type of tire, having an integral or a removable tread, or having an integral or removable assembly rim.

What is claimed is:

1. A pneumatic tire comprising
   a tread having an annular reinforcement which is substantially inextensible in its circumferential and traverse directions, said tread being wider than any other part of the tire, beads adapted to engage bead seats in the wheel rim, and two sidewalls extending from the lateral edges of said tread to said beads, each sidewall having a first zone of reduced bending stiffness adjacent said edges, a second zone of reduced bending stiffness adjacent said beads, and a third zone of reduced bending stiffness intermediate said first and second zone, said sidewalls extending in mutually converging relationship from said first to said third zone of reduced bending stiffness and in mutually diverging relationship from said third to said second zone of reduced bending stiffness, whereby said sidewalls have a configuration convex towards the interior of the tire, the bending stiffness, thicknesses and curvatures of said sidewalls in their several zones being such as to maintain said convexity in the inflated condition of the tire, whereby said sidewalls are constrained between said edges of the tread and said beads and are placed in compression stress.

2. A pneumatic tire as in claim 1, characterized in that the ratio between the bending stiffness at least at one of said low stiffness zones of each sidewall and the bending stiffness of the other parts of said sidewall does not exceed a value of 0.6.

3. A pneumatic tire as in claim 2, characterized in that said ratio is comprised between 0.6 and 0.01.

4. A pneumatic tire as in claim 1, characterized in that the various values of bending stiffness are obtained by imparting different thicknesses to the meridian section of each sidewall.

5. A pneumatic tire as in claim 1, characterized in that the various values of bending stiffness are obtained by using materials having a different modulus of elasticity.

6. A pneumatic tire as in claim 5, characterized in that said zones of lower bending stiffness are constituted by a compound having a modulus of elasticity, measured at one-tenth of the tensile strength, comprised between 5 and 60 $Kg/cm^2$, while the zones of greater stiffness are constituted by a compound having a modulus of elasticity, measured at one-tenth of the tensile strength, comprised between 20 and 150 $Kg/cm^2$.

7. A pneumatic tire as in claim 5, characterized in that said zones of greater bending stiffness are constituted by a compound incorporating short fibers of a material having a modulus of elasticity higher than that of the compound itself.

8. A pneumatic tire as in claim 7, characterized in that said fibers are made of glass and most of them are oriented along a preferred direction.

9. A pneumatic tire as in claim 1, characterized in that at least in proximity of its joining with each sidewall, said inextensible annular reinforcement has a curvature convexly directed towards the tire inside.

10. A pneumatic tire as in claim 9, characterized in that the angle comprised between the axis of rotation of the tire and the tangent to the profile of the annular reinforcement in the joining zone between said inextensible annular reinforcement and each of the two sidewalls is between 20° and 60°.

11. A pneumatic tire as in claim 1, characterized in that said annular reinforcement has a structure comprising at least two layers of textile or metallic cords, said cords being crossed to each other, said layers being stiffened at their lateral edges by means of turn-ups of their skirtings, or by means of inextensible strips of cords arranged in the circumferential direction of the tire.

* * * * *